(12) United States Patent
Hu et al.

(10) Patent No.: US 6,862,494 B2
(45) Date of Patent: Mar. 1, 2005

(54) AUTOMATED COOKING SYSTEM FOR FOOD ACCOMPANIED BY MACHINE READABLE INDICIA

(75) Inventors: Ziqiang Hu, Prospect, KY (US); Jon Roepke, Louisville, KY (US)

(73) Assignee: General Electric Company, Schenectady, NY (US)

(*) Notice: Subject to any disclaimer, the term of this patent is extended or adjusted under 35 U.S.C. 154(b) by 85 days.

(21) Appl. No.: 10/013,619

(22) Filed: Dec. 13, 2001

(65) Prior Publication Data

US 2003/0139843 A1 Jul. 24, 2003

(51) Int. Cl.[7] ............................................. G06F 19/00
(52) U.S. Cl. ....................... 700/211; 99/325; 99/329 R; 99/331; 219/702; 219/708; 426/243; 700/90; 700/299; 700/300; 700/305
(58) Field of Search ................ 99/325, 329 R, 99/331, 326; 219/702, 708, 710, 711, 712, 257, 264, 482, 494, 510, 527, 678, 703, 704; 426/243, 241; 700/90, 211, 299, 300, 305, 215, 225; 370/392.52

(56) References Cited

U.S. PATENT DOCUMENTS

| | | | |
|---|---|---|---|
| 3,975,720 A | 8/1976 | Chen et al. | .................. 219/712 |
| 4,323,773 A | 4/1982 | Carpenter | |
| 4,339,646 A | 7/1982 | Doi et al. | |
| 4,390,768 A * | 6/1983 | Teich et al. | .................. 219/708 |
| 4,450,345 A | 5/1984 | Hotta et al. | |
| 4,481,409 A * | 11/1984 | Smith | ........................... 219/518 |
| 4,508,948 A * | 4/1985 | Carlson | ........................ 219/708 |
| 4,553,011 A | 11/1985 | Nakata et al. | ................ 219/711 |
| 4,780,588 A | 10/1988 | Edamura | |
| 4,810,511 A * | 3/1989 | Velupillai et al. | ............ 426/242 |
| 4,874,928 A | 10/1989 | Kasai | |
| 4,967,049 A | 10/1990 | Kaneshiro et al. | ........... 219/712 |
| 5,285,041 A | 2/1994 | Wright | |
| 5,426,280 A * | 6/1995 | Smith | ........................... 219/506 |
| 5,491,323 A | 2/1996 | Mori et al. | ................... 219/710 |
| 5,495,095 A | 2/1996 | de Matteis et al. | |
| 5,530,229 A * | 6/1996 | Gong et al. | .................. 219/711 |
| 5,541,394 A | 7/1996 | Kouchi et al. | |
| 5,565,655 A | 10/1996 | Jeon | ............................ 177/245 |
| 5,681,496 A * | 10/1997 | Brownlow et al. | .......... 219/707 |
| 5,698,126 A * | 12/1997 | Morita et al. | ................ 219/704 |
| 5,796,081 A | 8/1998 | Carlsson et al. | ............. 219/711 |
| 5,798,945 A | 8/1998 | Benda | |
| 5,812,393 A | 9/1998 | Drucker | |
| 5,883,801 A | 3/1999 | Drucker et al. | |
| 5,919,389 A * | 7/1999 | Uehashi et al. | .............. 219/711 |
| 5,938,966 A | 8/1999 | Oh et al. | |
| 5,949,779 A | 9/1999 | Mostafa et al. | |
| 5,978,855 A * | 11/1999 | Metz et al. | ................... 709/249 |
| 5,994,683 A | 11/1999 | Braunisch et al. | |
| 6,013,907 A * | 1/2000 | Lee | ............................... 219/703 |
| 6,040,565 A | 3/2000 | Akerlind | |
| 6,066,839 A | 5/2000 | Park | ............................. 219/710 |
| 6,132,084 A * | 10/2000 | Whipple et al. | ............. 374/131 |
| 6,137,095 A | 10/2000 | Kashimoto et al. | |
| 6,198,084 B1 * | 3/2001 | Kim | ............................. 219/703 |
| 6,229,130 B1 | 5/2001 | Furuta et al. | ................ 219/711 |
| 6,444,965 B1 * | 9/2002 | Ha et al. | ...................... 219/702 |

(List continued on next page.)

Primary Examiner—Leo Picard
Assistant Examiner—Carlos R. Ortiz-Rodriguez
(74) Attorney, Agent, or Firm—McAndrews, Held & Malloy, Ltd.; Peter J. Vogel; Michael A. Dellapenna (57) ABSTRACT

An automated cooking system (10) cooks food (12) accompanied by machine-readable indicia, such as a bar code (16) read by a reader (18). Cooking data, including function coefficients, are accessed from an Internet server (20) based on the information in the bar code. An oven (40) cooks the food in phases in response to the cooking data and one or more monitored food parameters of humidity, temperature and weight. The cooking is controlled by functions in which one or more food parameters are multiplied by coefficients that vary according to food type.

36 Claims, 4 Drawing Sheets

U.S. PATENT DOCUMENTS

| | | | |
|---|---|---|---|
| 6,480,753 B1 * | 11/2002 | Calder et al. | 700/83 |
| 6,486,453 B1 * | 11/2002 | Bales et al. | 219/702 |
| 6,501,058 B2 * | 12/2002 | Jung | 219/703 |
| 6,521,871 B1 | 2/2003 | Shelton | 219/401 |
| 6,550,681 B1 * | 4/2003 | Ross et al. | 235/462.13 |
| 2002/0184568 A1 * | 12/2002 | Kurrasch | 714/39 |
| 2003/0109938 A1 * | 6/2003 | Daum et al. | 700/11 |
| 2003/0144746 A1 * | 7/2003 | Hsiung et al. | 700/28 |

* cited by examiner

AUTOMATED COOKING SYSTEM FOR FOOD ACCOMPANIED BY MACHINE READABLE INDICIA

BACKGROUND OF THE INVENTION

The invention relates to cooking systems, and more particularly relates to such systems that employ automatic controls.

Automated cooking systems have been known in the past. For example, U.S. Pat. No. 5,883,801 describes a cooking system in which weight and geometry on a package are input to a computer (FIG. 16 and Col. 14, lines 35–58). U.S. Pat. No. 5,565,655 describes a weight sensor, including a pair of facing electrodes and an annular spacer, used in a microwave oven. (See the Abstract). U.S. Pat. No. 5,426,280 (the "'280 Patent") describes a bar code on a food package that is read to look up in memory a stored cooking program. The cooking program can include cooking time, temperature and power level setting. (See the Abstract.) U.S. Pat. No. 5,285,041 describes a code reader in a microwave oven that reads a bar code on a food package in order to control an oven. (See the Abstract.) According to U.S. Pat. No. 4,874,928 (the "'928 Patent"), food weight and steam (or humidity) are detected to determine cooking time by a microwave oven. (See the Abstract and Col. 6 (FIG. 13)). Surface temperature detection is described at Col. 1, lines 22–23. U.S. Pat. No. 4,780,588 describes an optical device that reads cooking data. Another input device enters cooking restriction data. A computer operates a heater based on the cooking data and cooking restriction data. (See the Abstract.) The control of appliances over AC power lines and networks is shown in U.S. Pat. No. 5,798,945 (the "'945 Patent") and U.S. Pat. No. 5,949,779 (the "'779 Patent").

Although the '928 Patent employs two phases of operation, it does not take advantage of various detectable food parameters that enhance the resulting cooked food. Although the '928 Patent describes calculations carried out during the cooking process that depend in part on the type of food (e.g., Col. 10, lines 36–42), there is no attempt to arrange the calculations by products of food parameters and food-type-dependent coefficients that enhance the resulting food product and improve the efficiency of downloading from a remote location. Although the '928 Patent describes adjustment of power level (Col. 7, lines 1–5 and FIG. 9(b)), it ignores the advantages of varying power level based on detected food temperature.

None of the foregoing cooking systems controls the cooking process to reach the optimum taste consistently for an inexperienced homemaker. The present invention addresses this problem and provides a solution.

BRIEF SUMMARY OF THE INVENTION

A first embodiment of the invention is useful for cooking a plurality of types of food by applying heat to the food. In the first embodiment, parameters of the food are measured and the food is cooked by calculating one or more functions comprising one or more parameters combined with one or more coefficients determined through cooking trials.

A second embodiment of the invention is useful for cooking food by heating the food at a controllable level, measuring the temperature of the food and calculating the level of the heating in response to the measured temperature.

A third embodiment of the invention is useful for cooking food in at least a first phase. The first phase comprises determining a first temperature of the food, calculating the duration of the first phase in response to the first temperature and heating the food in the first phase at a level determined in response to the first temperature.

According to a fourth embodiment of the invention, the food also is cooked in a second phase comprising determining a second temperature of the food, weighing the food to determine the food weight, determining the humidity adjacent the food, calculating the duration of the second phase in response to the food weight and determined humidity, and heating the food in the second phase at a level determined in response to the second temperature.

By using the foregoing, techniques, an inexperienced person may cook food with a degree of accuracy and ease previously unavailable.

DETAILED DESCRIPTION OF THE INVENTION

Figure 1:
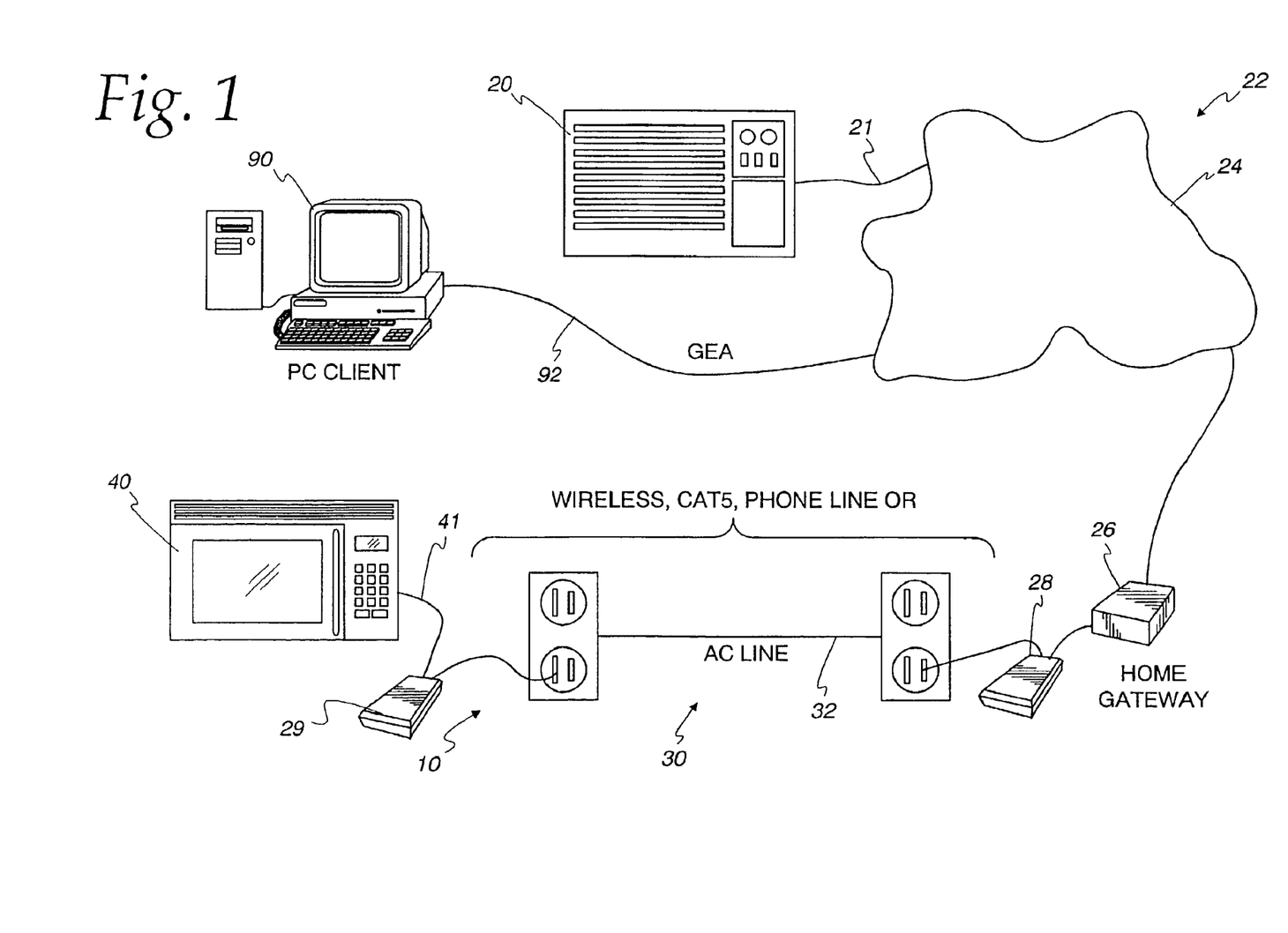
FIG. 1 is a schematic diagram of a preferred form of the invention illustrating an oven and an Internet connection for accessing cooking data.
Figure 2:
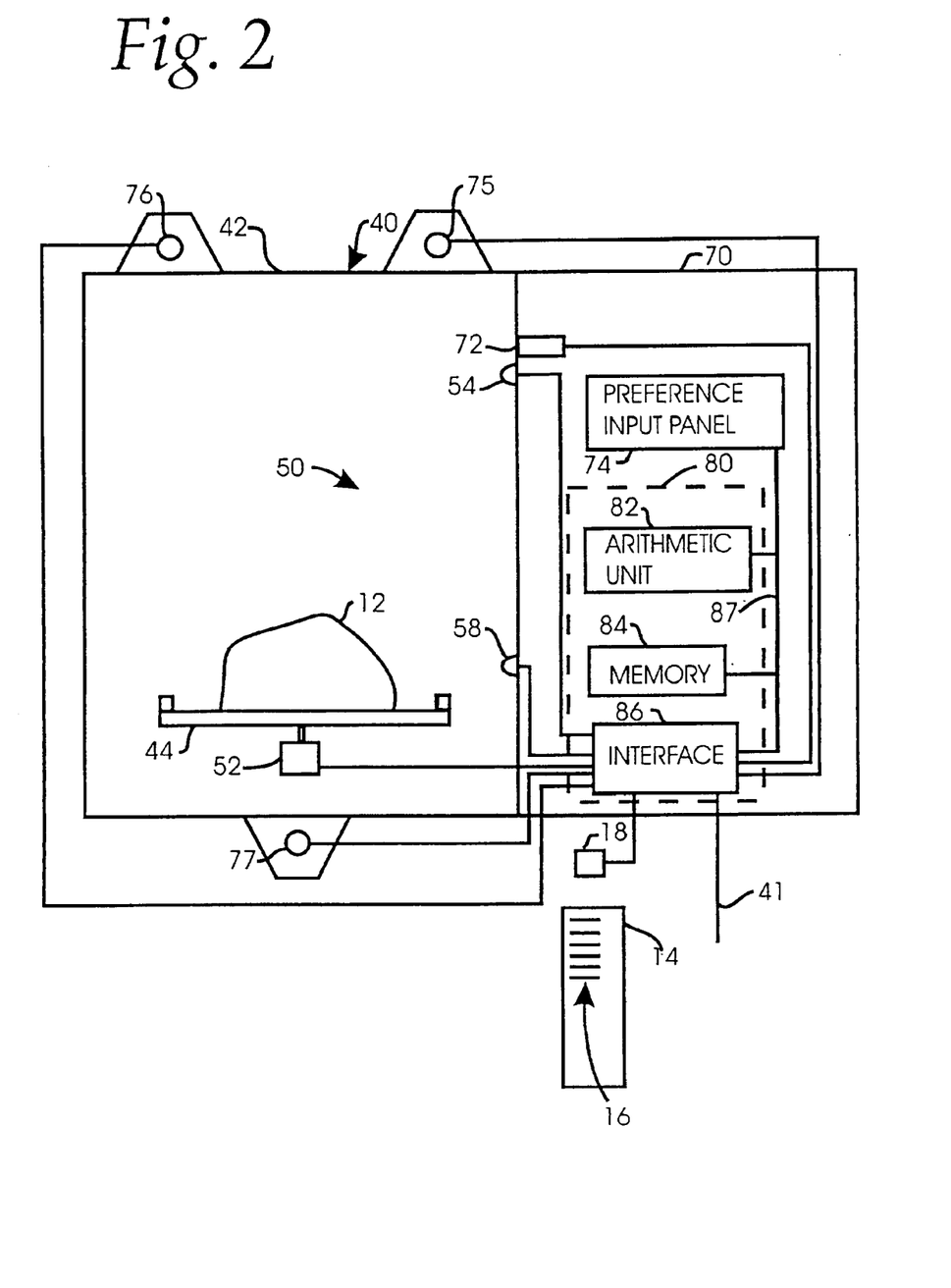
FIG. 2 is a schematic block diagram of a preferred form of the oven shown in FIG. 1.

Referring to FIGS. 1 and 2, a cooking system 10 is adapted to cook food 12 that is accompanied by a wrapper 14 bearing machine-readable indicia, such as a bar code 16. Bar code 16 includes food content information, such as the type of food, and a uniform resource locator (URL) that identifies an Internet location. A conventional bar code reader 18 reads bar code 16. There are many possible locations to position the bar code reader. For example, the reader may be integrated within the control panel area, on the edge of the door, on the edge of the cooking device frame, or internally within the cooking cavity.

The URL is used to access cooking data, which may include a recipe and/or a cooking program, as well as coefficients depending on food type used in the calculation of functions that control the cooking process. The cooking data preferably is stored in a computer memory, such as a memory of an Internet server computer 20 that is provided access to a network 22 via a cable 21. Network 22 includes a wide area network 24, such as the Internet, a home gateway 26, modems 28 and 29, and a local area network 30. Network 30 may comprise physical media to communicate with a home gateway, such as an AC power line 32, a radio frequency (RF) link, twisted wire, a phone line or category 5 wire (4 twisted pair cable). The AC power line control may be implemented as shown in the '945 Patent.

Referring to FIG. 2, food 12 is cooked in an oven 40, which may comprise a microwave and halogen light oven, such as the GE Advantium Oven, coupled to modem 29 by a cable 41 (FIG. 1). In general, oven 40 may be constructed like the oven shown in FIG. 11 of the '928 Patent. Oven 40 includes a cooking compartment 42 with a food tray 44.

A detector assembly 50 within oven 40 includes a food weight detector 52, a food humidity detector 54 and a food surface temperature detector 58, all connected as shown. The weight and humidity detectors may be constructed as described in Col. 6 of the '928 Patent and the temperature detector may be of the type described in Col. 1 of the '928 Patent. The system will function without use of all sensors; i.e., not all sensors described must be used for unit functionality.

Oven 40 includes a control compartment 70 that comprises a magnetron 72 and devices 75–77 for changing the temperature of food 12. In one embodiment, devices 75–77 each comprise a halogen lamp; in a second embodiment, device 75 comprises a halogen lamp, while devices 76–77 each comprise a ceramic heater.

A user preference panel 74 enables a user to input cooking preferences, such as the degree of cooking desired, and the size and/or portion of package to be cooked. For example, a user may input rare, medium or well done to indicate the desired cooking of meat items.

Compartment 70 also includes a processor 80 comprising an arithmetic unit 82, a memory 84 and an interface 86 all interconnected by a bus 87 in a well-known manner. User preference panel 74 also is coupled to bus 87. The processor may be configured as shown in the '280 Patent.

Referring to FIG. 1, a personal computer (PC) 90 is coupled to network 22 by a cable 92. In a well-known manner, PC 90 may initiate operation of oven 40 from a location remote from the oven through an authentication process.

Figure 3:
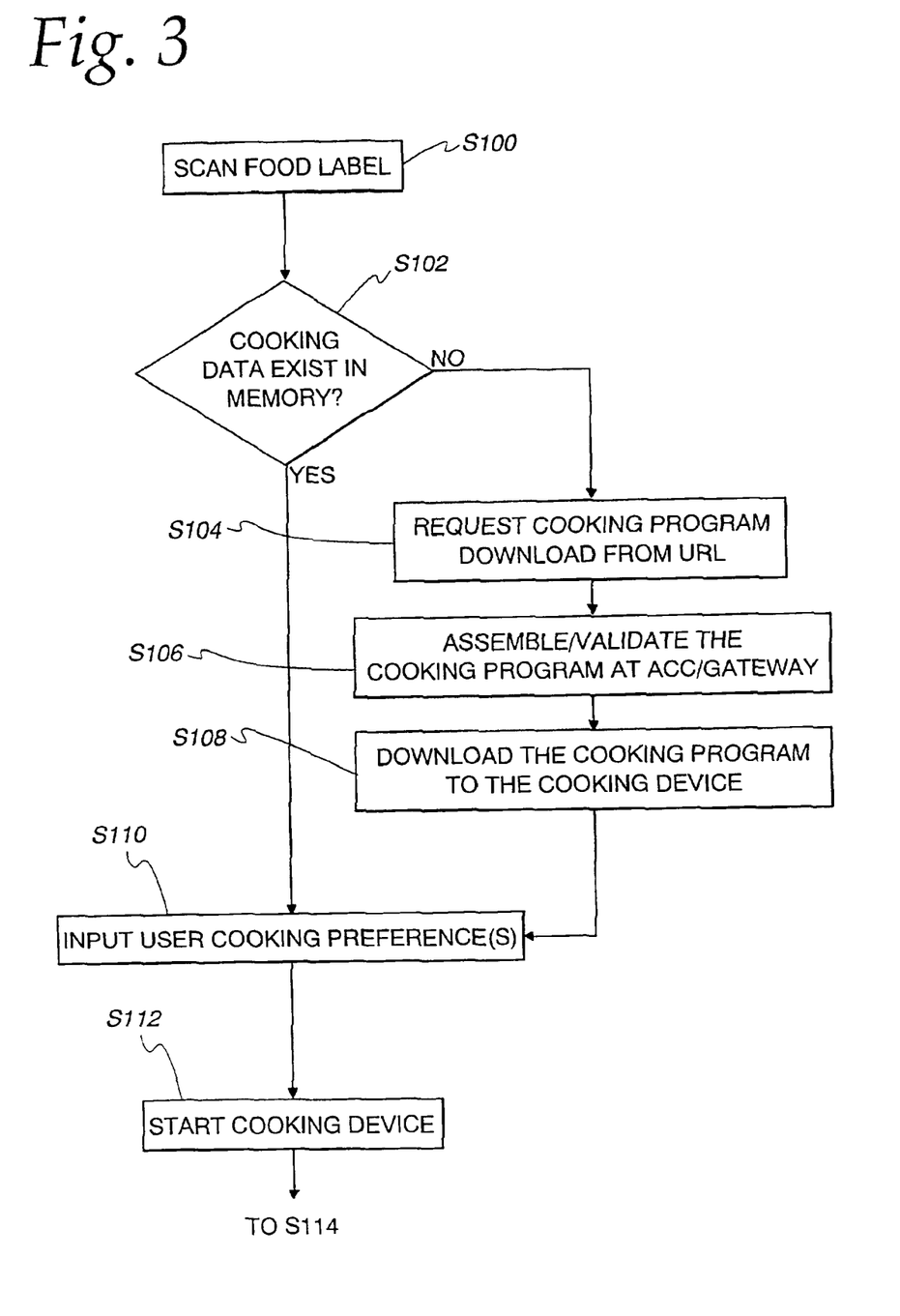
FIG. 3 is a flow diagram illustrating a preferred form of process initiation.

The operation of system 10 and an exemplary cooking program obtained from server 20 is described in connection with FIGS. 3–4. An initialization process is shown in FIG. 3. Referring to step S100, when pre-processed food 12 is put into oven 40, its wrapper 14 is scanned through reader 18 to obtain food content information and a URL that are temporarily stored in memory 84. Based on the content information, in step S102, processor 80 determines whether cooking data exists in memory 84. If not, in steps S104, S106 and S108, processor 80 obtains cooking data, such as a cooking menu, recipe, cooking program or coefficients depending on type of food, from server 20 through network 22, which may be the Internet. The Internet communication may be carried out as described in the '779 Patent using transmission control protocol/internet protocol (TCP/IP). Other types of protocol also may be used. Alternatively, if the answer to the question in step S102 is affirmative, such cooking data may be obtained from memory 84 in oven 40.

As shown in step S110, the user cooking preferences are input from input panel 74 by processor 80. Processor 80 develops a cooking profile that includes an on/off time of magnetron 72 and/or devices 75–77 to achieve the best food cooking performance. Magnetron 72 and devices 75–77 can turn on and off independently to achieve different cooking results, e.g., microwave energy cooks well the deep inside portions of the food and light energy cooks well the outside portions of the food.

For the embodiment in which devices 75–77 each are halogen lamps, the manner in which the power levels of magnetron 72 and halogen lamps 75–77 are adjusted for a variety of foods and cooking situations is explained in the following Table 1. In Table 1, the power levels are based on a 32 second duty cycle. The power levels represent the number of seconds within the duty cycle that the lamps and/or magnetron are on.

TABLE 1

| Power Level | Upper Lamp 75 | Upper Lamp 76 | Lower Lamp 77 | Magnetron 72 |
|---|---|---|---|---|
| 0 | 0 | 0 | 0 | 0 |
| 1 | 4 | 5 | 4 | 3 |
| 2 | 7 | 7 | 7 | 6 |
| 3 | 11 | 10 | 11 | 10 |
| 4 | 14 | 13 | 14 | 13 |
| 5 | 17 | 16 | 17 | 16 |
| 6 | 20 | 18 | 20 | 19 |
| 7 | 23 | 21 | 23 | 22 |
| 8 | 27 | 24 | 27 | 26 |
| 9 | 30 | 27 | 30 | 29 |
| 10 | 32 | 29 | 32 | 32 |

For the example of Table 1, a user may enter a power level separately for upper lamps 75–76, lower lamp 77 and magnetron 72 through panel 74. Alternatively, a cooking algorithm individually defines the power level for upper lamps 75–76, lower lamp 77 and magnetron 72. For example, refrigerated crescent rolls are cooked using the following algorithm:

| | |
|---|---|
| Total Duration | 4 min. 30 sec. |
| Power Level of lamps 75–76 | 10 (i.e., lamp 75 = 32 and lamp 76 = 29) |
| Power Level of lamp 77 | 3 (i.e., lamp 77 = 11) |
| Power Level of Magnetron 72 | 3 (i.e., magnetron 72 = 10) |

For the embodiment in which device 75 is a halogen lamp and devices 76–77 are ceramic heaters, the manner in which the power levels of magnetron 72 and devices 75–77 are adjusted for a variety of foods and cooking situations is explained in the following Table 2.

TABLE 2

| INPUT | OUTPUT | | |
|---|---|---|---|
| Power Level | U | L | MW |
| 10 | 32 | 32 | 0 |
| 9 | 32 | 25 | 0 |
| 8 | 32 | 22 | 0 |
| 7 | 32 | 20 | 0 |
| 6 | 28 | 28 | 4 |
| 5 | 28 | 20 | 4 |
| 4 | 26 | 22 | 6 |
| 3 | 22 | 22 | 10 |
| 2 | 18 | 18 | 14 |
| 1 | 10 | 10 | 22 |

In the example of Table 2, the user can enter only a single power level. "U" identifies the power lamp 75 and heater 76, "L" identifies the power level for heater 77 and "MW" identifies the power level for magnetron 72. Alternatively, a cooking algorithm may define the power level for the Table 2 example.

The power levels for both the Table 1 and Table 2 examples are governed by limiting the amount of time magnetron 72 and/or devices 75–77 are energized.

An adaptive process is used to adjust the cooking profile based on one or more food parameters, such as food weight, food surface temperature and humidity in compartment 42. The cooking profile preferably is in the form of a transfer function that outputs the optimal power level of magnetron 72 and/or devices 75–77 and cooking time for a particular food item in response to one or more measured food parameters. The power levels and cook times for each food are a function of measured food parameters including, but not limited to, weight, temperature and/or humidity. The transfer functions can be stored in a table in memory 84 or downloaded from the Internet. An alternative method is to download only certain coefficients for the transfer function, which reduces the time required to retrieve the requisite data from the Internet. In any case, the cooking profile consists of an explicit set of instructions to optimally cook a specific food load.

Figure 4:
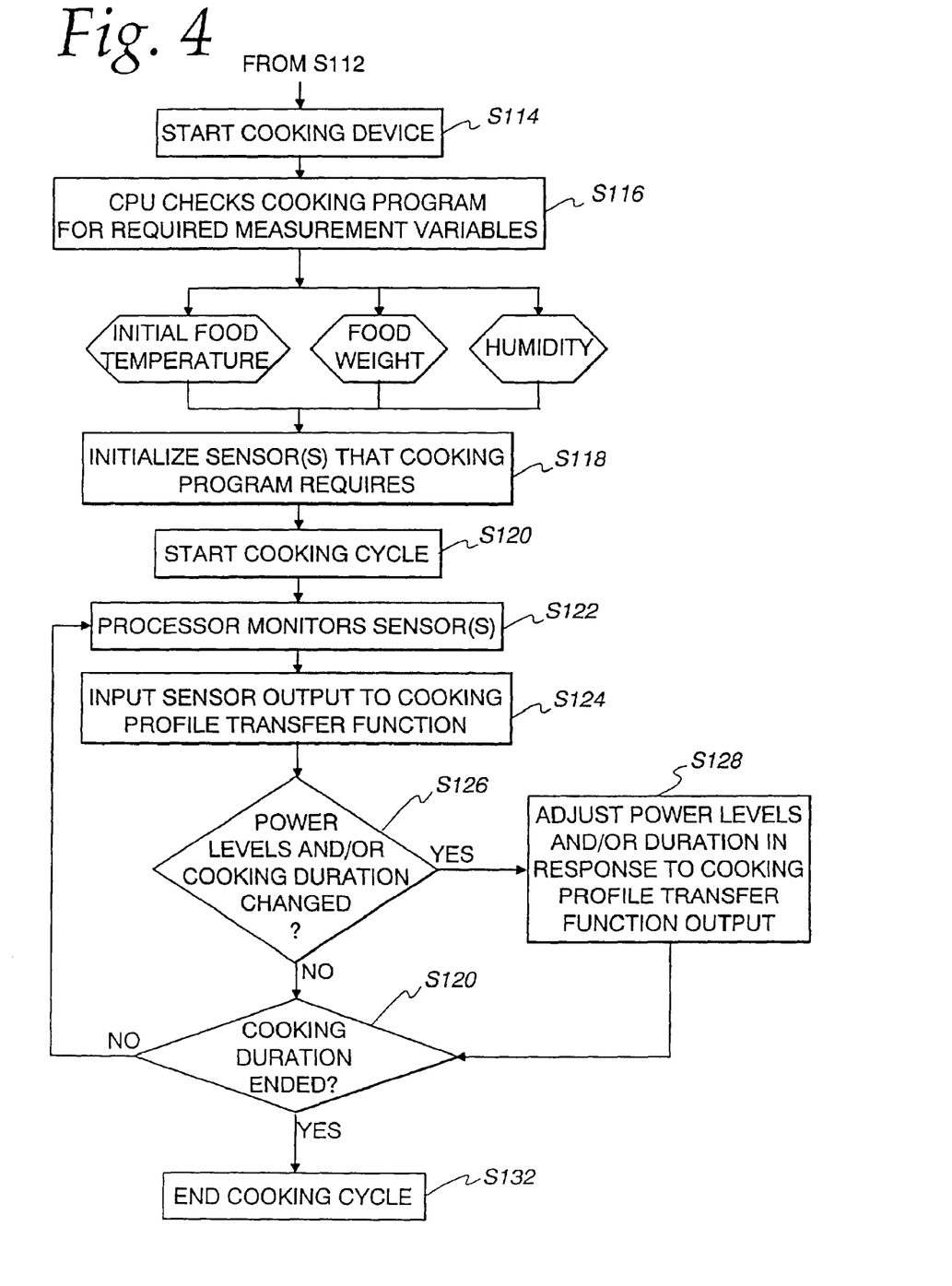
FIG. 4 is a flow diagram illustrating a preferred form of an adaptive cooking process according to the invention.

The adaptive process is described in the flow chart of FIG. 4.

In step S114, one or more of magnetron 72 and devices 75–77 are started.

In step S116, processor 80 checks the cooking program for required measurement variables, such as initial food temperature, food weight and humidity.

In step S118, processor 80 initializes one or more of the previously described detectors required by the cooking program.

In step S120, processor 80 starts the cooking cycle.

In step S122, processor 80 monitors the detectors.

In step S124, processor 80 outputs the food parameters measured by the detectors to a cooking profile transfer function.

In step S126, processor 80 determines whether the power levels or cooking duration have changed.

If the answer to step S126 is affirmative, in step S128, processor 80 adjusts the power levels and/or cooking duration in response to the cooking profile transfer function output.

If the answer to step S126 is negative, in step S130, processor 80 determines whether the cooking duration has ended.

If the answer to step S130 is affirmative, the cooking cycle ends at step S132.

If the answer to step S130 is negative, the program returns to step S122. Examples of such cooking profiles employing transfer functions are described in the following Table 3:

W=initial food weight
H=humidity
$U_i$=upper power level
$L_i$=lower power level
$M_i$=microwave power level
$t_i$=cooking time $T_i$, W and H are food measurement parameters measured by corresponding detectors. $U_i$, $L_i$, $M_i$, and $t_i$ are cooking profile outputs.

As shown in Table 3, the parameters and coefficients are arranged in pairs so that a single parameter is combined with a single coefficient, such as by multiplying the parameter times the coefficient. Any number of measurement parameters and cooking profile outputs may exist. Separate functions are provided for calculating cooking duration and power level.

The power level calculations in Table 3 are based on the device and magnetron arrangement of Table 1.

The cooking duration function $t_1=(0, 5:00-f_1*T_i)$ means that the cooking duration in phase 1 extends from time 0 to 5 minutes minus the value of coefficient $f_1$ multiplied by parameter $T_i$.

The expression $2*H_{@3:00}$ means 2 times the value of the humidity at 3 minutes into the current phase of the cooking cycle.

The cooking duration function of the MW Popcorn example of Table 3 means a duration that extends from time 0 to the value of $f_{15}$ added to the time at which the humidity has a value of 0.85.

The upper power level function $U_1=f_2-f_3*T_i$ means a level equal to coefficient $f_2$ minus coefficient $f_3$ times a food temperature $T_i$.

The cooking duration function $t_1=(0, 4:45-f_{16}*T_i+f_{17}*W_i)$ means that the cooking duration in phase 1 extends from time 0 to 4:45 minutes minus the value of coefficient $f_{16}$ multiplied by parameter $T_i$ plus the value of coefficient $f_{17}$ multiplied by parameter $W_i$.

The upper power level function $U_1=f_{18}-f_{19}*T_i$ means a level equal to coefficient $f_{18}$ minus coefficient $f_{19}$ times a food temperature $T_i$.

The remaining functions are apparent based on the examples given above.

TABLE 3

| Food Item | Cook Phase | Cooking Duration Function | Upper Power Level Function | Lower Power Level Function | Microwave Power Level Function |
|---|---|---|---|---|---|
| Boneless Chicken Breast | 1 | $t_1 = (0, 5:00 - f_1*T_i)$ | $U_1 = f_2 - f_3*T_i$ | $L_1 = f_4-f_5*T_i$ | $M_1 = f_6-f_7*T_i$ |
| | 2 | $t_2 = 5:00 - f_1*T_i, 4:00 + f_8*W + 2*H_{@3:00})$ | $U2 = f_9- f_{10}*T_i$ | $L1 = f_{11}- f_{12}*T_i$ | $M_1 = f_{13}- f_{14}*T_i$ |
| MW Popcorn | 1 | $t_1 = (0, t\ @_{H-0.85} + f_{15})$ | $U_1 = 0$ | $L_1 = 0$ | $M_1 = 10$ |
| Fish Sticks | 1 | $t_1 = (0, 4:45 - f_{16}*T_i + f_{17}*W_1)$ | $U_1 = f_{18}- f_{19}*T_i$ | $L_1 = f_{20}- f_{21}*T_i$ | $M_1 = f_{22}- f_{23}*T_i$ | where:
$f_1$ through $f_{23}$=coefficients having values that vary with food type and/or amount, which can be determined through cooking trials
$T_i$=food surface temperature $T_i$ have different values during phases 1 and 2.

An example of a cooking profile for cooking one pound of boneless chicken breast at an initial temperature of 40 degrees Fahrenheit where $f_1=f_3=f_5=f_7=0.01$, $f_2=5$, $f_4=4$, and $f_6=9$ according to Table 3 is the following:

| PHASE 1 Cooking: | | | |
|---|---|---|---|
| Cooking Duration Function | Upper Power Level Function | Lower Power Level Function | Microwave Power Level Function |
| $t_1 = (0, 5:00 - 0.01*T_1)$ (0, 5:00 − 0.4 min) 0.4 min = 24 sec $t_1 = (0, 4:36)$ | $U_1 = 5 - 0.01*T_i$ 5 − 0.4 round to nearest integer $U_1 = 5$ | $L_1 = 4 - 0.01*T_i$ 4 − 0.4 round to nearest integer $L_1 = 4$ | $M_1 = 9 - 0.01*T_i$ 9 − 0.4 round to nearest integer $M_1 = 9$ |
| PHASE 2 Cooking: $t_2$ is measured from the time at which phase 1 ended. Humidity H is read at 3 minutes into the phase 2 cooking cycle. | | | |
| Cooking Duration Function | Upper Power Level Function | Lower Power Level Function | Microwave Power Level Function |
| $t_2 (5:00 - f_1*T_1, 4:00 + 2*W + 2*H @_{3:00})$ (5:00 − 4 min, 4:00 + 2 + 2*.85) H is read by sensor at 3:00 min into phase 2 $t_2 = (4:36, 7:42)$ | $U_2 = 8 - 0.01*T_i$ 8 − 0.4 round to nearest integer $U_2 = 8$ | $L_2 = 8 - 0.01*T_i$ 8 − 0.4 round to nearest integer $L_2 = 8$ | $M_2 = 3 - 0.01*T_i$ 3 − 0.4 round to nearest integer $M_2 = 3$ |

The expression $t_2=(4:36, 7:42)$ means phase 2 cooking begins at 4 minutes and 36 seconds and ends at 7 minutes and 42 seconds.

An example of a cooking profile for cooking one pound of boneless chicken breast at an initial temperature of 60 degrees Fahrenheit where $f_1=f_3=f_5=f_7=0.01$, $f_2=5$, $f_4=4$, and $f_6=9$ according to Table 3, is the following:

An example of a cooking profile for cooking ¼ pound fish sticks at an initial temperature of 32 degrees Fahrenheit where $f_{19}=f_{21}=f_{23}=0.01$, $f_{18}=4$, $f_{16}=0.04$, $f_{17}=0.8$, $f_{20}=3$, and $f_{22}=9$ according to Table 3 is the following:

| PHASE 1 Cooking: | | | |
|---|---|---|---|
| Cooking Duration Function | Upper Power Level Function | Lower Power Level Function | Microwave Power Level Function |
| $t_1 = (0, 5:00 - 0.01*T_1)$ (0, 5:00 − 0.6 min) 0.6 min = 36 sec $t_1 = (0, 4:24)$ | $U_1 = 5 - 0.01*T_i$ 5 − 0.6 round to nearest integer $U_1 = 4$ | $L_1 = 4 - 0.01*T_i$ 4 − 0.6 round to nearest integer $L_1 = 3$ | $M_1 = 9 - 0.01*T_i$ 9 − 0.6 round to nearest integer $M_1 = 8$ |
| PHASE 2 Cooking: | | | |
| Cooking Duration Function | Upper Power Level Function | Lower Power Level Function | Microwave Power Level Function |
| $t_2 = (5:00 - f_1*T_i, 4:00 + 2*W + 2*H @_{3:00})$ (5:00 − .6 min, 4:00 + 2 + 2*.75) H is read by sensor at 3:00 min into phase 2 $t_2 = (4:24, 7:30)$ | $U_2 = 8 - 0.01*T_i$ 8 − 0.6 round to nearest integer $U_2 = 7$ | $L_2 = 8 - 0.01*T_i$ 8 − 0.6 round to nearest integer $L_2 = 7$ | $M_2 = 3 - 0.01*T_i$ 3 − 0.6 round to nearest integer $M_2 = 2$ |

The expression $t_2=(4:24, 7:30)$ means phase 2 cooking begins at 4 minutes and 24 seconds and ends at 7 minutes and 30 seconds.

| PHASE 1 Cooking: | | | |
|---|---|---|---|
| Cooking Duration Function | Upper Power Level Function | Lower Power Level Function | Microwave Power Level Function |
| $t_1 = (0, 4:45 - f_{16}*T_i + f_{17}*W_i)$ | $U_1 = f_{18}-f_{19}*T_i$ | $L_1 = f_{20}-f_{21}*T_i$ | $M_1 = f_{22}-f_{23}*T_1$ |

-continued

| PHASE 1 Cooking: | | | |
|---|---|---|---|
| Cooking Duration Function | Upper Power Level Function | Lower Power Level Function | Microwave Power Level Function |
| (0, 4:45 − 1.08 min) 1.08 min = 65 sec $t_1 = (0, 3:40)$ | 4 − 0.3 round to nearest integer $U_1 = 4$ | 3 − 0.3 round to nearest integer $L_1 = 3$ | 9 − 0.4 round to nearest integer $M_1 = 9$ |

An example of a cooking profile for cooking 1 pound fish sticks at an initial temperature of 32 degrees Fahrenheit where $f_{19}=f_{21}=f_{23}=0.01$, $f_{18}=4$, $f_{16}=0.04$, $f_{17}=0.8$, $f_{20}=3$, and $f_{22}=9$ according to Table 3 is the following:

| PHASE 1 Cooking: | | | |
|---|---|---|---|
| Cooking Duration Function | Upper Power Level Function | Lower Power Level Function | Microwave Power Level Function |
| $t_1 = (0, 4:45 − f_{16}*T_i + f_{17}*W_i)$ (0, 4:45 − 0.48 min) 0.48 min = 29 sec $t_1 = (0, 4:16)$ | $U_1 = f_{18}−f_{19}*T_i$ 4 − 0.3 round to nearest integer $U_1 = 4$ | $L_1 = f_{20}−f_{21}*T_i$ 3 − 0.3 round to nearest integer $L_1 = 3$ | $M_1 = f_{22}−f_{23}*T_1$ 9 − 0.4 round to nearest integer $M_1 = 9$ |

The downloaded cooking profile may be heater and microwave power levels and cooking time, or the profile may be in the form of a transfer function that accepts data input and outputs the power levels and time. For example, interface 86 is capable of downloading the cooking profile for fish sticks directly, as U=4, L=3, M=9, time=4:16, or as a transfer function (see Table 3).

There are many possible locations to position the bar code reader. For example, the reader may be integrated within the control panel area, on the edge of the door, on the edge of the cooking device frame, or internally within the cooking cavity.

The system will function without use of all sensors; i.e., not all sensors described must be used for unit functionality.

The cooking profile for each food item may be defined by a transfer function, which may comprise any multiple of terms. Examples of transfer functions are:

$$T_1 = \left(0, \sum_1^a F_i M_i\right)$$

Where $T_1$=time interval of phase 1
$F_i$=ith input factor
$M_i$=ith input measurement (ie, M1=1, M2=output from temperature sensor, . . . )
a=the number of measurement variables required+1 (since $M_1$−1 by default)

$$U_1 = \sum_{a+1}^b F_i M_i$$

Where $U_1$=Heater "U" power level during phase 1
$F_i$=ith input factor
$M_i$=ith input measurement (ie, $M_{a+1}=1$ $M_{a+2}$=output from temperature sensor, . . . )

→For example, $U_1=(F_4+F_5*M_5+F_6*M_6)$ $$M_1 = \sum_{b+1}^c F_i M_i$$

Where $M_1$=microwave power level during phase 1
$F_i$=ith input factor
$M_i$=ith input measurement (ie, $M_{b+1}=1$, $M_{b+2}$=output from temperature sensor, . . . )
b=2*a
c=3*a
Functions for $T_p$, $U_p$, $M_p$, . . . , where p=the cooking phase, are derived using the same rationale described for $T_1$, $U_1$ and $M_1$.

a+1=the number of measurement variables required+2 (since $M_1=M_{a+1}=1$ by default)
b=2*a, where 2 is equal to the cooking parameter number (c=3*a, d=4*a, etc.).

As shown above, the transfer function may define a finite series based on an infinite series, such as the Taylor series, and can accommodate any number of sensors. This is an advantage when new cooking functions are defined, old cooking functions are modified, or new sensors are used.

Examples of the $F_i$ input factors are the coefficients $f_1$–$f_{23}$. The $F_i$ input factor also may be a constant. Examples of the $M_i$ input measurements are $T_i$, W and H.

The inputs for each transfer function are food type (input through bar code information), amount (measured by weight sensor, or input by consumer), humidity (measured by humidity detector), surface temperature (measured by surface temperature detector) and/or cavity temperature (measured by cavity temperature sensor). The outputs of each transfer function are cooking time and lamp, heater and/or magnetron power levels.

The cooking profile for foods that are defined as "sensitive," that is, food items that are difficult to cook because of dependence on accuracy of temperature and cook time, may be defined by a multiple-phase cooking profile. A multiple phase cooking profile would consist of distinct power levels at various phases during the cooking cycle. For example, a frozen pizza cooking profile may consist of high microwave power in the early stages of cooking to defrost, then convert to high heat at a predetermined time in the cook cycle to cook and crisp. As another example, a fresh dough cycle may consist of low heat in the early stages to rise and proof the dough, then convert to moderate heat to bake the bread.

Those skilled in the art will recognize that the preferred embodiments may be modified or altered without departing from the true spirit and scope of the invention as defined in the accompanying claims. For example, the cooking transfer functions may comprise any multiple of terms. There may be one or more cooking phases. Any number or type of sensors may be used. Any type of information transfer protocol may be used.

What is claimed is:

1. An automated cooking system including a chamber for cooking a plurality of types of food comprising:
    a heater having a controllable power output to heat the food in the chamber;
    detectors arranged to measure parameters of the food; wherein the parameters comprise food weight and food temperature; and
    a processor arranged to cook the food by calculating one or more functions comprising the parameters of the food multiplied by one or more coefficients determined through cooking trials, wherein the one or more functions comprise a first function for calculating cooking duration and a second function for calculating the power level of the heater.

2. A system, as claimed in claim 1, wherein the detectors comprise:
    a weight detector arranged to weigh the food;
    a temperature detector arranged to detect the temperature of the food; and
    a humidity detector arranged to measure the humidity in at least a portion of the chamber, and
    wherein the parameters further comprise humidity adjacent the food.

3. A system, as claimed in claim 1, wherein the parameters and coefficients are arranged in pairs so that a single parameter is multiplied by a single coefficient.

4. A system, as claimed in claim 1, wherein the coefficients are downloaded from a remote source.

5. A system, as claimed in claim 4, wherein the remote source comprises the Internet.

6. An automated method for cooking a plurality of types of food by applying heat to the food comprising:
    measuring parameters of the food, wherein the parameters of the food include food weight and food temperature; and
    cooking the food by calculating one or more functions comprising the parameters of the food multiplied by one or more coefficients determined through cooking trials, wherein the one or more functions comprise a first function for calculating cooking duration and a second function for calculating the power level of the heat.

7. A method, as claimed in claim 6, wherein the parameters further comprise humidity adjacent the food.

8. A method, as claimed in claim 6, wherein the parameters and coefficients are arranged in pairs so that a single parameter is multiplied by a single coefficient.

9. A method, as claimed in claim 6, wherein the coefficients are downloaded from a remote source.

10. A method, as claimed in claim 9, wherein the remote source comprises the Internet.

11. An automated cooking system including a chamber for cooking food comprising:
    a heater having a controllable power output to heat the food in the chamber;
    a temperature detector arranged to measure the temperature of the food; and
    a processor arranged to calculate the power level of the heater in response to the detected temperature, wherein the food is cooked based on at least one of a first function for calculating cooking duration and a second function for calculating the power level of the heat.

12. A system, as claimed in claim 11, wherein the heater comprises a magnetron and an electrical heater.

13. A system, as claimed in claim 12, wherein the electrical heater comprises a lamp and a ceramic heater.

14. A system, as claimed in claim 11, wherein the temperature detector comprises a surface temperature detector.

15. An automated method of cooking food comprising:
    heating the food at a controllable level;
    measuring the temperature of the food; and
    calculating the level of the heating in response to the measured temperature, wherein food is cooked based on a first function for calculating cooking duration and a second function for said calculating level of the heat.

16. A method, as claimed in claim 15, wherein said heating comprises magnetron heating and electrical heating.

17. A method, as claimed in claim 16, wherein said electrical heating comprises lamp heating and ceramic heating.

18. A method, as claimed in claim 15, wherein said measuring the temperature of the food comprises measuring the surface temperature of the food.

19. An automated cooking system including a chamber for cooking food comprising:
    a heater having a controllable power output to heat the food in the chamber;
    a weight detector arranged to weigh the food;
    a temperature detector arranged to detect the temperature of the food;
    a humidity detector arranged to measure the humidity in at least a portion of the chamber; and
    a processor arranged to cook the food during at least a first cooking phase by reading the temperature detector to determine a first temperature, calculating the duration of the first phase in response to the first temperature and calculating the power output of the heater in response to the first temperature, and wherein the processor is arranged to cook the food during a second cooking phase by reading the temperature detector to determine a second temperature, reading the weight detector to determine the food weight, reading the humidity detector to determine said humidity, calculating the duration of the second phase in response to the food weight and humidity and calculating the power output of the heater in response to the second temperature.

20. A system, as claimed in claim 19, wherein the heater comprises a magnetron.

21. A system, as claimed in claim 19, wherein the heater comprises a device selected from the group consisting of a halogen lamp and a ceramic heater.

22. A system, as claimed in claim 19, wherein the processor calculates the duration of the first phase in part by combining the first temperature with a first coefficient.

23. A system, as claimed in claim 22, wherein the processor calculates the power output during the first phase in part by combining the first temperature with a second coefficient.

24. A system, as claimed in claim 23, wherein the processor calculates the duration of the second phase in part by combining the food weight with a third coefficient and combining the humidity with a fourth coefficient.

25. A system, as claimed in claim 24, wherein the processor calculates the duration of the second phase in part by combining the second temperature with a fifth coefficient.

26. A system, as claimed in claim 25, wherein said coefficients depend on the type of food and wherein the type of food is read from a wrapper for the food.

27. A system, as claimed in claim 25, wherein said coefficients are downloaded from an Internet location identified through a uniform resource locator using TCP/IP.

28. An automated method of food cooking comprising cooking the food in at least a first phase comprising:
    determining a first temperature of the food;
    calculating the duration of the first phase in response to the first temperature;
    heating the food in at least the first phase at a level determined in response to the first temperature; and
    cooking the food in a second phase comprising:
        determining a second temperature of the food;
        weighing the food to determine the food weight;
        determining the humidity adjacent the food;
        calculating the duration of the second phase in response to the food weight and determined humidity; and
        heating the food in the second phase at a level determined in response to the second temperature.

29. A method, as claimed in claim 28, wherein the heating comprises magnetron heating.

30. A method, as claimed in claim 28, wherein the heating further comprising lamp heating.

31. A method, as claimed in claim 28, wherein said calculating the duration of the first phase comprises combining the first temperature with a first coefficient.

32. A method, as claimed in claim 31, wherein said heating the food in the first phase comprises calculating the level of heat by combining the first temperature with a second coefficient.

33. A method, as claimed in claim 32, wherein said calculating the duration of the second phase comprises combining the food weight with a third coefficient and combining the humidity with a fourth coefficient.

34. A method, as claimed in claim 33, wherein said calculating the duration of the second phase comprises combining the second temperature with a fifth coefficient.

35. A method, as claimed in claim 34, wherein said coefficients depend on the type of food and wherein the type of food is read from a wrapper for the food.

36. A method, as claimed in claim 34, wherein said coefficients are downloaded from the Internet location identified through a uniform resource locator using TCP/IP.

* * * * *